May 1, 1928.

A. I. McALLEN 1,668,540

AUTOMATIC COFFEE MAKING MACHINE

Original Filed Aug. 23, 1924    3 Sheets-Sheet 1

Inventor:
Anna Irene McAllen,
By Attorney,
Horace Barnes.

May 1, 1928.
A. I. McALLEN.
1,668,540
AUTOMATIC COFFEE MAKING MACHINE
Original Filed Aug. 23, 1924     3 Sheets-Sheet 2
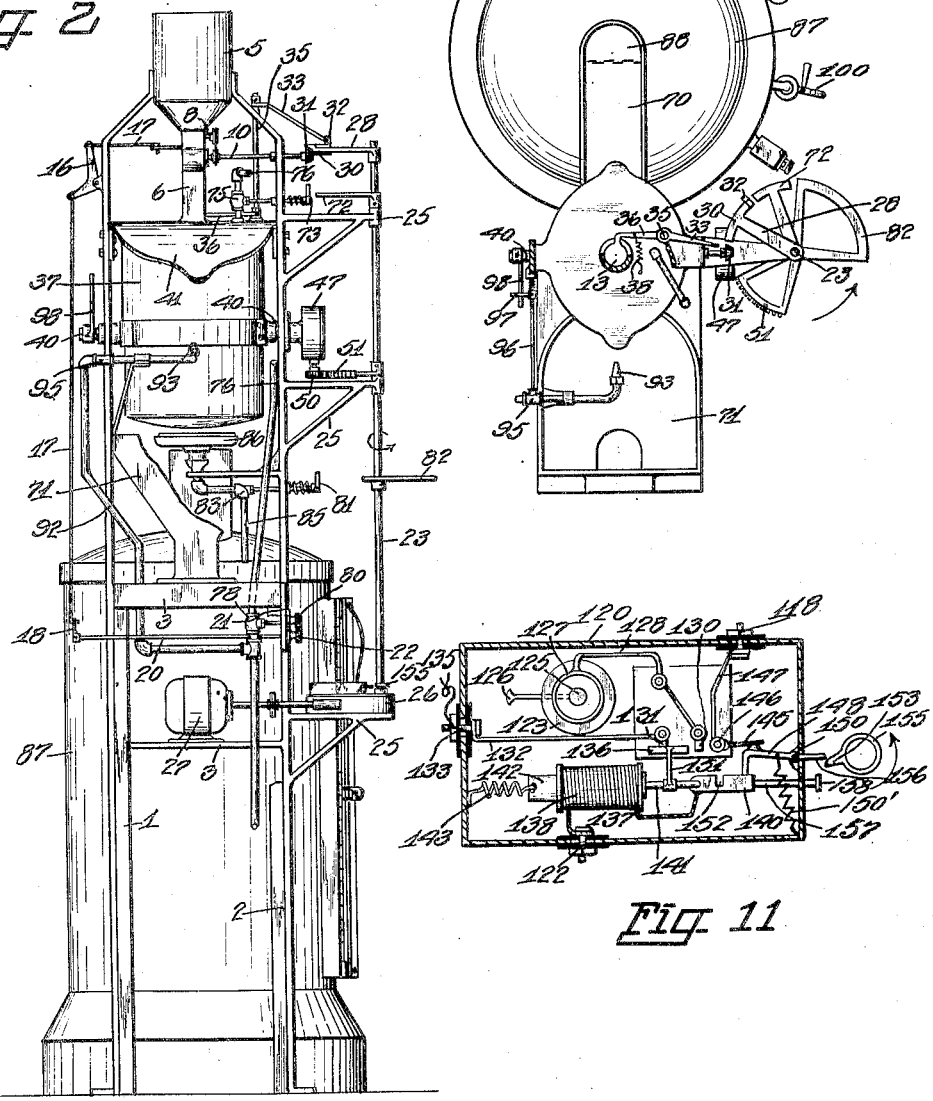
Inventor:
Anna Irene McAllen,
By Attorney
Horace Barnes.

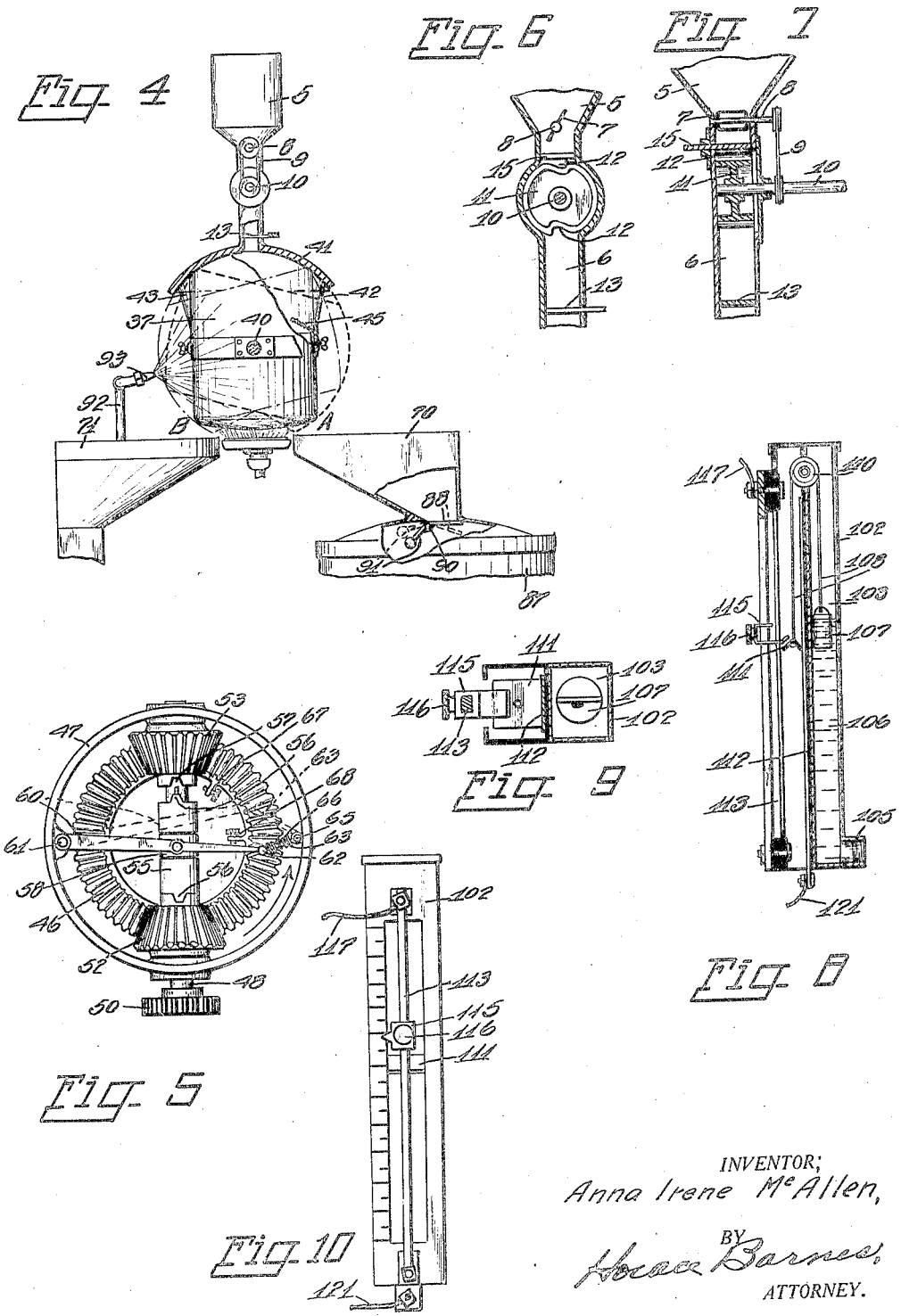

Patented May 1, 1928.

1,668,540

UNITED STATES PATENT OFFICE.

ANNA IRENE McALLEN, OF PORTLAND, OREGON.

AUTOMATIC COFFEE-MAKING MACHINE.

Application filed August 23, 1924, Serial No. 733,698. Renewed September 28, 1927.

This invention relates to improvements in automatic coffee making apparatus.

The object of my invention is a coffee making apparatus of simple and economical construction wherein an infusion of coffee of any desired strength may be prepared in any desired quantity within the capacity of the machine and in accordance with approved and scientific principles.

A further object of the invention is the provision of means whereby the proportional amounts of coffee and water to produce a coffee beverage of desired strength may be regulated and varied at will through the agency of dial devices to the end that coffee of uniform quality will be produced irrespective of the quantity prepared at one time.

A still further object of the invention resides in the provision of simple and improved means to accomplish the successive operative functions of the machine in the preparation of coffee in timed relation through the controlled activities of a master-shaft.

A still further object of the invention is to provide means to initiate the operative cycle of the machine for the preparation of predetermined amount of coffee selectively either by the depletion of the coffee in the retaining urn to a minimum amount to actuate the motive power by automatic circuit closing mechanism of simple construction, or by closing said circuit manually by the operator, the said cycle being effectuated and concluded in the same manner in both cases.

A still further object of the invention resides in the provision of a machine for making coffee wherein the coffee is infused in an easily cleaned vessel or pot and is delivered directly into a dispensing urn whereby a healthful beverage may be prepared under hygienic conditions.

Other objects and advantages and objects relating to specific and meritorious parts of the invention and in the construction thereof will be readily apparent in the detailed description of my invention to follow.

The accompanying drawings illustrate by way of example a coffee making machine embodying the principles and practical workings of my invention, in which:

Fig. 2 is a view in side elevation of the same.

Fig. 3 is a top plan view of the same.

Fig. 4 is a fragmentary view in rear elevation showing the upper portion of my improved apparatus, parts thereof being broken away and other parts being shown somewhat diagrammatically.

Fig. 5 is an enlarged detached front view of the pot actuating mechanism with the front cover removed.

Fig. 6 is a fragmentary view in vertical section of the dry-coffee metering devices.

Fig. 7 is a view in vertical cross-section taken in an axial plane at ninety degrees from the section plane shown in Fig. 6.

Fig. 8 is a detail view in vertical section showing the circuit closing devices attached to the dispensing urn.

Fig. 9 is a cross-sectional view of the same.

Fig. 10 is a detached view in front elevation of the devices shown in Figs. 8 and 9.

Fig. 11 is a sectional view through the casing containing the motor-controlling devices illustrating such devices in plan.

Figure 1:
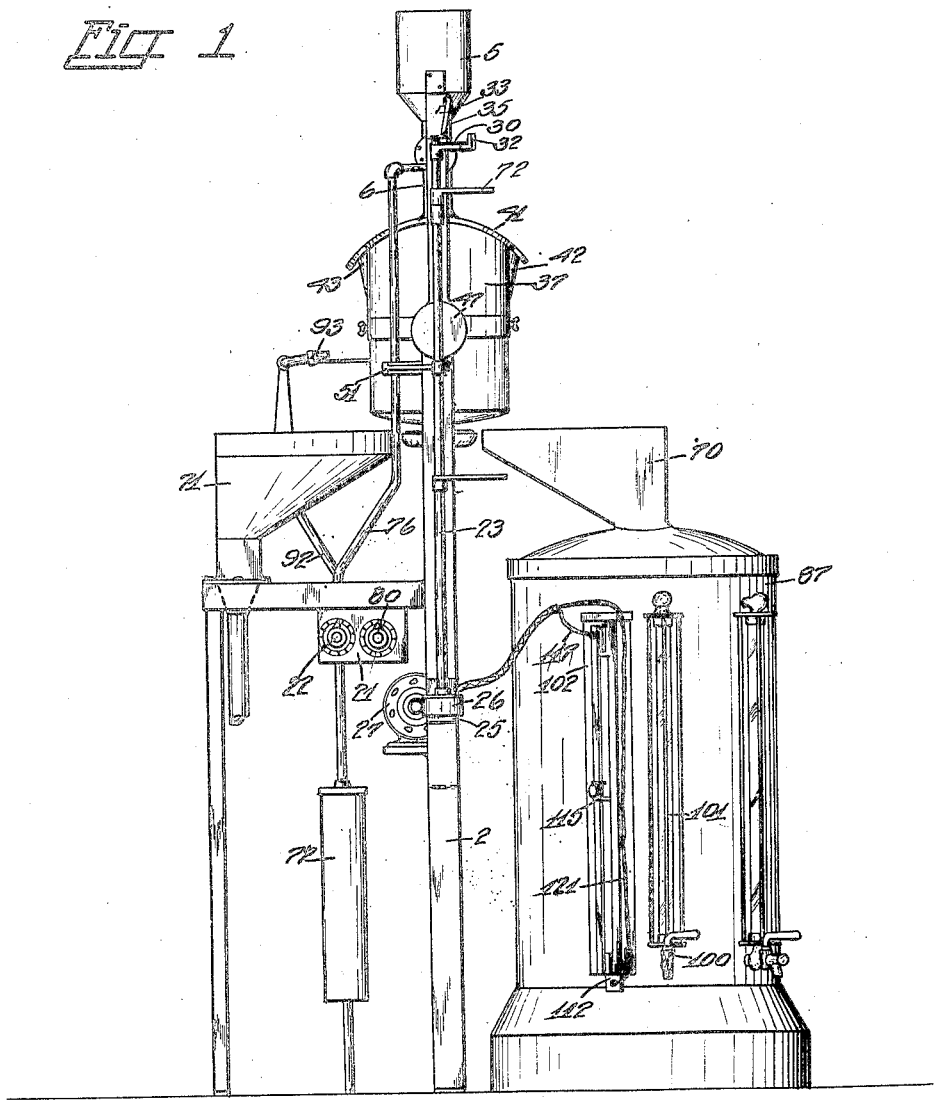
Figure 1 is a view in front elevation of an automatic coffee-making machine embodying my invention.

Referring to said views, the reference numerals 1 and 2 indicate vertical members of a structural frame for the support of my apparatus, and 3 transverse tie-members therefor, some of which are positioned at suitable places whereat they may serve as supports for the various operative elements of the invention.

A container 5 for ground coffee is rigidly secured at the upper ends of said vertical frame-members and is of sufficient capacity to supply fresh ground coffee for a day's use or for a considerable portion thereof. The lower portion of said container is formed with an inverted conical breast leading to an outlet opening into a delivery tube 6.

A rotary feeder device 7 for stirring the ground coffee and ensuring the movement thereof through said opening is mounted in said opening, its arbor 8 being driven by belt 9 from the shaft 10. A measuring wheel 11 is keyed on said shaft 10 within said tube 6 and is formed with pockets 12 in its periphery wherein the dry coffee lodges as it comes from the container and is deposited into the tube therebelow upon the valve-plate 13 in measured quantities.

The number of revolutions of said wheel 11 with said shaft is relatively fixed and with the fully open condition of the wheel the maximum amount of coffee will be fed from the container for the making of the next infusion of coffee. A gauge-plate 15 is slidably mounted in the walls of said tube above the wheel 11 and in close relation thereto and is arranged adjustably to mask a greater or lesser portion of said wheel-pockets 12 so that in the revolutions of the wheel more or less coffee within the maximum capacity of the pockets will be fed into the lower end of the tube.

Said plate 15 is articulately connected through bell-crank 16 and connections 17 with an arm 18 upon rod 20 journaled in the frame and in the dial-plate 21 terminating in a knob and indicator 22 whereby through the graduations upon said dial-plate the position of said gauge-plate 15 relative to the wheel-pockets may be indicated and adjustably positioned.

A vertically disposed master-shaft 23 is journaled in brackets 25 extending from frame-member 2 and is rotatably driven by suitable speed-reduction gearing, not shown, contained within the case 26 and driven by an electric motor 27 mounted on said frame-structure. Said shaft is driven at a constant rate of speed which can be varied by the employment of a variable speed motor or other suitable agencies, such as a change in the gear ratios.

One complete revolution is given the shaft 23 to accomplish each cycle of the machine's operations; the starting and stopping mechanism therefor will be described in detail hereinafter. At the upper end of said shaft an arm 28 extends formed with a segment 30 at its outer end provided with beveled gear-teeth adapted to engage during the early period of the revolution of said master-shaft 23 with a bevel-pinion 31 keyed upon the end of shaft 10 whereby the measuring wheel 11 and the feeding device 7 are actuated.

At the rear end of said segment 30 as it moves away from engagement with the pinion 31 a trip-lug 32 is formed adapted to intercept a lever 33 rigidly connected with a vertically disposed rocking-arbor 35 and having an arm 36 connected thereto at its lower end to which the valve-plate 13 is attached. In the movements of said segment the lug 32 engages the lever 33 to rock the arbor 35 to withdraw the plate 13 and to release the coffee supported thereon to drop into the infusion-pot 37. Thus after a charge of coffee of predetermined amount as regulated by the gauge-plate 15 is measured by the wheel 11 and deposited upon the plate 13 it is discharged into the pot and the spring 38 will return the plate 13 back to its original position when the lug 32 has passed beyond the lever 33.

Said infusion-pot, see Fig. 4, is mounted in said frame for lateral swinging movements on trunnions 40 and is formed with upper edges terminating in an arc centered in the common axis of said trunnions and in close relation to a correspondingly formed fixed cover 41 rigid with the tube 6 whose bore extends therethrough. Said pot is provided with a spout 42 at one side midway between said trunnions to facilitate the pouring therefrom of the coffee infusion and upon the opposite side a similar spout 43 is provided from which the coffee dregs are removed. A strainer 45 is positioned in said pot in proximity to said spout 42 to remove all grounds or floating particles when the coffee is poured from the pot.

Rigid with one of said trunnions 40 is a bevel gear-wheel 46 enclosed in a casing 47, see Fig. 5. A vertical mandrel 48 is rotatably mounted in said casing and is provided at its lower end exteriorly of the casing with a spur-pinion 50 which is engaged during a period of each revolution of said shaft 23 by a segment-gear 51 keyed on said shaft. Interiorly of the casing oppositely disposed bevel-pinions 52 and 53 in mesh at opposite sides, respectively, with said gear-wheel 46 are loosely mounted on said mandrel. A clutch 55 is splined on said mandrel and is formed at each end with projections 56 adapted to interfit with corresponding recesses 57 in the respective pinions 52 and 53 to engage the mandrel with one or the other of said pinions and to rotate the bevel-wheel 46 in opposite directions according to the pinion engaged.

A collar 58 is mounted on said clutch to which a lever 60 is connected intermediate its ends. One end of said lever is pivoted at 61 to the casing and the opposite end is provided with a rotatable post 62 having an aperture through which a pin 63 slidably extends. Said pin is hingedly connected at 65 with the casing at a point diametrically opposite the lever-pivot 61 and between said post 62 and the connection 65 a coil-spring 66 is interposed about said pin. Stops 67 and 68 are provided on said bevel-wheel 46 at suitable positions to engage upon opposite sides, respectively, of the lever 60 in the rotation of said bevel-wheel, and to thereby deflect the said lever to one side or the other of a center line between the pivot-points 61 and 65 which, owing to the action of the spring 66 relative to the lever 60 and pin 63 will snap to one side or the other and cause the engagement of the clutch 55 with one of said bevel-pinions 52 or 53.

Referring to Figs. 4 and 5, and in describing the action of said mechanism in its control of the movements of the pot 37 it will be understood that in the revolution of the segment gear 51 with the shaft 23 when it first engages the spur-pinion 50 to rotate the mandrel 48 the bevel-gear 46 is in the rotary position corresponding to the midway or erect position of the pot to which it is connected through one of the trunnions 40, as illustrated in full lines in Fig. 4, or midway of the travel of the pot and bevel-gear in one of their movements.

When the segment gear meets the spur-pinion 50 the clutch is in engagement with bevel-pinion 52 and is actuated to drive the bevel-gear 46 in the rotary direction indicated by the arrow in Fig. 5 which causes the pot to tip in the direction indicated by broken lines A in Fig. 4, that is to say, in the direction to empty the coffee infusion into the funnel 70. Near the end of the tipping movements of the pot the stop 67 will engage the lever 60 which will be in the position indicated in full lines in Fig. 5 and carry it past the center line between the pivots 61 and 65 to snap over into the position indicated in broken lines in said view whereupon the clutch is thrown out of engagement with pinion 52 and into engagement with pinion 53 to reverse the movement of said bevel-gear 46 and the pot causing the gear to rotate in a direction contrary to that indicated by the arrow in Fig. 5.

The pot is carried over its erect position in such reverse movement and into downwardly tilted condition into the position indicated in broken lines B in Fig. 4 to discharge the coffee grounds from the pot into the hopper 71. The stop 68 then engages the lever 60 and throws it back into the original position indicated in full lines to re-engage the pinion 52 which causes the gear 46 to again rotate in the direction of the arrow and bring the pot to an erect position as shown in full lines in the views whereat the gear-segment 51 in the rotation of the shaft 23 passes from its operative connection with the spur-pinion 50 leaving the clutch 55 still in its engagement with the pinion 52 where it will be again actuated upon the next cycle of the shaft to complete the tipping movement of the pot to pour out the infusion of coffee prepared in the next succeeding cycle of operations.

Prior to the above described operations and subsequent to the discharge of ground coffee into the pot as already explained, the revolution of the master-shaft 23 will cause the engagement of the trip-arm 72 with a trip-lever 73 of a valve 75 controlling the flow of water through a water-supply pipe 76 leading from a source of water supply under pressure into the pot 37. Said pipe has included therein a heater 77 of any suitable type through which the water is heated to nearly the boiling point. The flow of water through said pipe is further controlled by a valve 78 actuated by a knob and indicator 80 positioned on said dial-plate 21 adjacent said coffee-indicator 22. The valve 78 controls the volume of water passing through said pipe 76 in a given period of time and the trip-arm 72 is elongated in its arcuate direction at its outer end to hold the trip-lever 73 open for a given length of time according to the rate of travel of said shaft 23. The relative proportions of coffee and water are thus regulated by means of the indicators 22 and 80, respectively.

After the desired and proportionate amount of water is poured into the pot upon the coffee a trip-lever 81 is engaged by an arc-plate 82 of said shaft 23 to hold open a gas-valve 83 of a gas-supply pipe 85 leading to a gas-burner 86 having a pilot-light connected therewith, not shown, to ignite the gas when turned on. Said gas-burner is positioned under the pot when in erect position and will heat the contents thereof until the plate 82 releases the trip-lever 81 to shut off the supply of gas. An interval of time of longer or shorter duration as established by the relative positions about said shaft 23 of the arc-plate 82 and the segment-gear 51 will intervene between the shutting off of the gas and the coffee-pouring operations previously described, which interval of time is intended to allow the coffee-infusion process to be completed in the pot.

The infused coffee liquid will thereupon be poured into the funnel 70 of the urn 87 in which the coffee is retained for service to patrons. At or about the opening of said funnel into said urn a yieldable closure is provided to close the opening against the escape of vapor therefrom and may consist in a plate 88 closing said opening hingedly connected at 90 to the top of the urn and having an oppositely extended arm 91 having a weighted end of more effective gravity than said plate so that it will maintain the plate in closed condition except when a weight of liquid coffee is poured into the funnel whereupon the plate will yield to allow it to run into the urn.

Numeral 92 indicates a branch pipe communicatively connected to said water-supply pipe 76 below the valve 78 thereof having a nozzle 93 directed to spray a stream of water into the open end of the pot 37 when the pot is tilted over to discharge the grounds into the hopper 71 to flush the pot of such grounds and to clean the same preparatory to the preparation of a fresh supply of coffee. A control-valve 95 is interposed in said branch pipe 92 having a spring-pressed stem 96 extending into proximity of the adjacent trunnion 40 where a trip-lug 97 of said stem may be engaged by an arm 98 secured to rock with said trunnion to open said valve when the pot is rocked in the direction to discharge the grounds and thereby open the pipe flushing the pot while in tilted condition.

Provision is made for automatically instituting the initial step of energizing said motor to accomplish the various successive functions comprising the cycle of operations of my machine in the making of coffee, which may be briefly described as follows: The urn 87 will be provided with a faucet 100 to draw off the contents and a glass-gauge 101 of usual construction is associated therewith. The urn is also provided with a casing 102 containing a vertically disposed liquid compartment 103 communicatively connected by a nipple 105 with the coffee-containing vessel within said urn so that the coffee, indicated at 106, will flow into said compartment 103 and to the level of the coffee within the urn. A float 107 is contained within said compartment to float upon the surface of said coffee and is connected by a cord 108 working over a pulley 110 with a metal contact-bit 111 at its opposite end which is in slidable electric contact with a terminal-bar 112 secured in insulated condition on said casing.

Spaced outwardly from said terminal a vertical rod 113 is mounted in insulated condition at both ends to said casing and has slidably mounted thereon a terminal 115 provided with a set screw 116 whereby the terminal may be secured at any point desired on said rod. One end of said rod 113 is connected by a wire 117 with a binding-post 118 of a switch-box 120 and mechanism to be hereinafter explained, and the terminal-bar 112 is connected by wire 121 to another binding-post 122 of said box and includes a battery, not shown, therein. Said terminal 115 may be positioned on the rod 113 at any desired height and when the column of liquid in said compartment 103 is lowered by the withdrawal of the same through the faucet 100 or otherwise it will cause the bit 111 to raise and to bridge between the terminals 112 and 115 establishing an electric circuit including the switch-mechanism in said box 120 which circuit including said battery will hereinafter be called "circuit A" and causing the consequent closing of another circuit including said motor 27, hereinafter called "circuit B", as will be more fully explained.

Said switch-box 120, which may be positioned at any convenient place adjacent said motor, contains a socket 123 of common construction adapted to receive a terminal plug, not shown, with connections leading from a lighting circuit of the building in which the apparatus is used. The end contact-member 125 of said socket is grounded, as at 126, to the metal frame of the machine and to which also a wire, not shown, from one side of said motor is grounded. The rim contact-member 127 of said socket is connected by wire 128 with the pole-piece 130. A similar pole-piece 131 spaced apart from said pole 130 is connected by wire 132 with a binding-post 133 and it in turn is connected by wire 135 with the opposite side of said motor from said grounded side. The gap between said pole-pieces 130 and 131 may be closed to form said circuit B to energize the motor by a metal strip 136 in the following described manner.

Reference numeral 137 indicates generally a solenoid magnet in said switch-box having a wire-coil 138 wound thereabout and electrically connected at one end with the binding-post 122 and at the other end to a metal plate 140 mounted upon the end of a rod 141 of non-conducting material slidable in the end of the magnet body. 142 indicates the armature of said magnet yieldingly held in the position indicated in Fig. 11 by a spring 143. 145 designates a spring-metal strip extending outwardly from the stud 146 and in electrical connection by wire 147 with the binding-post 118 and said wire 117 leading to the urn. A spring-pressed dog 148 hingedly connected at 150 to the box is, in the open condition of the circuit A, held against the tension of the spring 150' upon the upper face of said plate 140 and against the spring-strip 145 making the electrical circuit A when the terminals 112 and 115 are closed.

Said gap-closing strip 136 is connected by a bar 151 to the rod 141 so that when the circuit A is closed by the lowering of the coffee in the urn the solenoid armature will pull forward closing said gap by the strip 136 energizing the motor. At said forward pull of the armature the dog 148 will drop under the tension of its spring 150' into a notch 152 in said plate 140 breaking contact with the strip 145 and thus opening the circuit A.

During the rotation of the master-shaft 23 as driven by the motor the various previously described operations of coffee-making are performed in their cycle including the pouring of the infused coffee extract into the urn which will cause the float 107 to rise and the breaking of the eelctrical bridge between the terminals 112 and 115. Thus it will be seen that when the dog 148 drops into the notch 152 simultaneously with the establishment of the motor circuit B the circuit A is broken and will remain so owing to the lowering of the bit 111 by the rise in level of the coffee in the urn so that upon the return of the dog to its original position in contact with strip 145 the circuit will remain open until the level of the coffee closes the same.

When the said cycle of operations is near its completion, that is to say, after the coffee has been poured into the urn and the pot 37 has been returned to its original position after the grounds have been emptied therefrom a lug 153 extending outwardly from a collar 155 rigidly secured upon said shaft 23 engages the extension 156 of the dog 148 protruding from the box to lift the dog from the notch 152 whereupon the spring 143 asserts itself to pull the armature 142 and the rod 141 rearwardly and breaking the bridge between the pole-pieces 130 and 131 to open said circuit B and stopping the motor, leaving the switch-box mechanism substantially as indicated in Fig. 11.

Rigid with said plate 140 is a rod 157 extending through the switch-box wall and terminating in a knob 158. It is evident that if it is not desired to institute the coffee making operations of the machine by the automatic starting devices associated with the urn that the operator may at any time start the motor through the closing of the circuit B for making a fresh supply of coffee by pulling out said rod 157 so that the dog 148 will drop into said notch 152 whereupon the operations of the machine will proceed as before described.

The operations of my improved coffee making machine may be briefly described as a whole as follows: With the shaft 23 at rest in the positions indicated in Figs. 3 and 11 the motor 27 may be energized either by the automatic devices attached to the coffee urn and controlled by the height of coffee in the urn or by means of the pull-rod 157. The shaft will then be actuated in the direction of the arrow in Fig. 3 causing the engagement of the bevel-gear segment 30 with the bevel-pinion 31 to rotate the shaft 10. Dry ground coffee is thus measured onto the plate 13 in the desired quantity and upon the termination of the rotation of the shaft 10 said plate is withdrawn by means of the trip-lug 32 engaging the arbor-lever 33 precipitating the coffee into the pot 37.

The pipe 76 supplying preheated water is then opened by the engagement of trip-arm 72 with the trip-lever 73 to open a valve in said pipe to cause the flow of a proportionate amount of water into the pot. Thereafter the arc-plate 82 will hold open the gas-valve 83 to heat the coffee materials during a suitable period through the gas-burner 86. A term will then ensue during which the coffee will steep after which the rotation of shaft 23 will bring the segment 51 into contact with the spur-pinion 50 which in turn will actuate the mechanism contained in casing 47 to rock the pot 37 into position to pour the contents into the urn 87. The initial movements of said pot will be in effect a continuation of the latter movements thereof during the last operation of the machine when the gear 51 passed away from its actuating contact with the pinion 50. Through the operations of said mechanism contained in casing 47 already described the pot will be caused to rock to the right hand side to pour the contents into the urn and then in reverse directions to the left hand side to deposit its contents of grounds into the hopper 71 opening as it does so the flush valve 95 to wash out the dregs by a stream of water. The pot will thereupon rock backwardly towards the right hand side and remain upstanding when the segment 51 will be released from the pinion 50 in erect position ready for another cycle of operations.

The final step in said cycle of operations will be the engagement of the lug 153 with the extension 156 of the dog 148 whereby the circuit B is interrupted and the motor disengaged bringing all parts of the machine to rest.

It will be noted that the pot 37 in which the coffee is brewed is of the simplest construction analogous to the common domestic coffee pot having nothing except the walls of the pot itself coming into contact with the coffee during its making. The pot may be made of porcelain or similar non-corrosive materials that may be readily cleansed and maintained in sanitary and highly wholesome condition.

From said pot the coffee is poured directly into the dispensing urn with no conducting pipes or conduits therefor to become contaminated and which may be cleaned only with difficulty.

It will also be noted that all the successive operations of the machine are controlled by a single master-shaft during a single revolution thereof and hence are subject to simple and readily understood regulatory adjustments that may be performed by the operator with the greatest ease.

The proportions of coffee and water as well as the quantity of coffee to be produced at any one operation of the machine are regulated by the indicators 22 and 80, respectively, which are positioned side by side and can be easily adjusted by the operator when changes are to be made either in the strength of the product or in the quantity thereof.

While I have described my invention with considerable detail I do not wish to be understood as confining myself to the precise construction shown as I apprehend that various changes in arrangement and in the parts thereof may be made without departing from the spirit of the invention and I specifically declare that all such modifications within the scope of the appended claims to be included in the protection afforded hereby.

Having described my invention, what I claim, is:

1. In a coffee making machine, the combination of a frame, an infusion pot mounted for oscillation in said frame, gear-mechanism for oscillating said pot in reverse directions, an urn for receiving the coffee poured from said pot in one of its oscillations, a hopper for receiving coffee-grounds from said pot in its opposite oscillations, a container for ground coffee, means including a measuring wheel for feeding coffee from said container to the pot, regulating means for limiting the amount of coffee delivered at each operation of said feeding means, water-supply connections with said pot including a valve, regulating devices for limiting the volume of water delivered through said valve, a gas-burner under said pot, gas-supply connections for said burner including a valve, a master-shaft rotatably mounted in said frame, operative means mounted on said shaft for actuating said coffee-feeding devices, and opening and closing said water- and gas-valves at predetermined intervals and periods, devices mounted on said shaft for actuating said oscillating mechanism for said pot, a motor for driving said shaft, an electric circuit including said motor, another electric circuit including a solenoid magnet, means mounted on said urn to close said second named circuit through the minimum height of a column of liquid contained therein wherein said magnet is energized to close said first named circuit, and manually operable means to close said first named circuit.

2. In a coffee making machine, the combination of a frame, an infusion pot mounted for oscillation in said frame, gear-mechanism for oscillating said pot in reverse directions, an urn for receiving the coffee poured from said pot in one of its oscillations, a hopper for receiving coffee-grounds from said pot in its opposite oscillations, a container for ground coffee, means including a measuring wheel for feeding coffee from said container to the pot, regulating means for limiting the amount of coffee delivered at each operation of said feeding means, water-supply connections with said pot including a valve, regulating devices for limiting the volume of water delivered through said valve, a branch-pipe from said water-supply connections including a nozzle, means to flush said pot from said branch-pipe as said pot is oscillated toward said hopper, a gas-burner under said pot, gas-supply connections for said burner including a valve, a master-shaft rotatably mounted in said frame, operative means mounted on said shaft for actuating said coffee-feeding devices and opening and closing said water- and gas-valves at predetermined intervals and periods, respectively, devices mounted on said shaft for actuating said oscillating mechanism for said pot, a motor for driving said shaft, an electric circuit including said motor, another electric circuit including a solenoid magnet, means mounted on said urn to close said second named circuit through a minimum height of a column of liquid contained in said urn whereby said magnet is energized to close said first named circuit, and manually operable means to close said first named circuit.

3. In a coffee making machine, the combination of a frame, an infusion pot mounted for oscillation in said frame, gear-mechanism for oscillating said pot in reverse directions, an urn for receiving the coffee poured from said pot in one of its oscillations, a container for ground coffee, means for feeding coffee in measured quantities from said container to the pot, regulating means for limiting the amount of coffee delivered at each operation of said feeding means, water-supply connections with said pot including a valve, regulating devices for limiting the volume of water delivered through said valve, a gas-burner under said pot, gas-supply connections for said burner including a valve, a master-shaft rotatably mounted in said frame, operative means mounted on said shaft for actuating said coffee-feeding devices and for opening and closing said water- and gas-valves at predetermined intervals and periods, respectively, devices mounted on said shaft for actuating said oscillating mechanism for said pot, a motor for driving said shaft, an electric circuit including said motor, another electric circuit including a solenoid magnet, and means to close said second named circuit whereby said first named circuit is closed to energize said motor.

4. In a coffee making machine, the combination of a frame, an infusion pot mounted for oscillation in said frame, gear-mechanism for oscillating said pot in reverse directions, an urn for receiving the coffee poured from said pot in one of its oscillations, a container for ground coffee, means for feeding coffee in measured quantities from said container to said pot, water-supply connections with said pot including a valve, a gas-burner under said pot, gas-supply connections for said burner including a valve, a master-shaft rotatably mounted in said frame, operative means mounted on said shaft for actuating said coffee-feeding devices and for opening and closing said water- and gas-valves at predetermined intervals and periods, respectively, devices mounted on said shaft for actuating said oscillating mechanism for said pot, a motor for driving said shaft, a switch for starting said motor, and means on said shaft for de-energizing said motor upon the completion of a cycle of revolution of said shaft.

5. In a coffee making machine, the combination of a frame, an infusion pot mounted for oscillation in said frame, means for oscillating said pot in reverse directions, a container for ground coffee, means for feeding coffee in measured quantities from said container to said pot, water-supply connections with said pot including a valve, means to heat the water in said pot, a master-shaft rotatably mounted in said frame, operative means mounted on said shaft for actuating said coffee-feeding devices and for opening and closing said water-valve, means mounted on said shaft for actuating said water-heating means, devices mounted on said shaft for actuating said oscillating mechanism for said pot, a motor for driving said shaft, a starting-switch for said motor, and means operative on said shaft for de-energizing said motor upon the completion of a cycle of revolution of said shaft.

6. In a coffee making machine, the combination of a frame, an infusion pot mounted for oscillation on said frame, means for oscillating said pot, a container for coffee, means for feeding coffee in measured quantities from said container into said pot, water-supply connections with said pot, means to pre-heat the water supply, means to heat the water while in the pot, a master-shaft rotatably mounted in said frame, means to drive said shaft for one revolution only, operative means mounted on said shaft for actuating said coffee-feeding devices, means operable with said shaft for delivering the water into said pot, means operable on said shaft for controlling said water-heating means, and devices operable with said shaft for actuating said pot-oscillating means.

7. In a coffee making machine, the combination with an infusion pot, and an urn for receiving the coffee infusion, of means for supplying coffee in measured quantities to said pot, means for supplying water in measured quantities to said pot, means to heat said water while in said pot, and a master-shaft arranged to be rotated for one revolution at each operation, said shaft being provided with devices for actuating said coffee-supplying means, for actuating said water-supplying and heating means, and for causing the delivery of the coffee infusion from said pot into said urn in the order stated.

8. A coffee making machine comprising a frame, a pot mounted for oscillation in said frame, a coffee-receiving urn, devices for oscillating said pot to pour the coffee liquid into said urn, a master-shaft rotatably mounted in said frame, connections operative during a portion of the rotation of said shaft to actuate said pot-oscillating devices, a motor operatively connected to said shaft, and means controlled by a predetermined minimum height of liquid in said urn for energizing said motor.

9. In a coffee making machine, the combination of a frame, an infusion pot mounted for oscillation in said frame, means for oscillating said pot, a container for coffee, means for feeding coffee in measured quantities from said container to said pot, water-supply connections with said pot, means to pre-heat the water supply, means to heat the water while in the pot, a master-shaft rotatably mounted in said frame, means to rotate said shaft, operative means mounted on said shaft for actuating said coffee-feeding devices, means operable with said shaft for delivering the water into said pot, means operable on said shaft for controlling said water-heating means, and means operable with said shaft for actuating said pot-oscillating means.

ANNA IRENE McALLEN.